(12) United States Patent
Borland et al.

(10) Patent No.: US 7,165,579 B2
(45) Date of Patent: Jan. 23, 2007

(54) PIPELINE REPAIR SYSTEM AND METHOD OF INSTALLATION

(75) Inventors: Robin Neil Borland, Smethport, PA (US); Henry E. Topf, Jr., Wellsboro, PA (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 10/952,657

(22) Filed: Sep. 29, 2004

(65) Prior Publication Data

US 2006/0065320 A1 Mar. 30, 2006

(51) Int. Cl.
F16L 55/18 (2006.01)

(52) U.S. Cl. .......................... 138/99; 138/97; 138/157; 285/373; 285/15; 156/94

(58) Field of Classification Search ................. 138/99, 138/97, 156, 155, 157, 159; 285/373, 15; 156/94
See application file for complete search history.

(56) References Cited

U.S. PATENT DOCUMENTS

| | | | | |
|---|---|---|---|---|
| 1,051,086 | A | 1/1913 | Clark | 285/373 |
| 3,142,205 | A | 7/1964 | Hulslander | 72/71 |
| 3,302,493 | A | 2/1967 | Hulslander | 72/71 |
| 3,480,043 | A * | 11/1969 | Viancour et al. | 138/99 |
| 3,954,288 | A | 5/1976 | Smith | 285/93 |
| 4,240,650 | A | 12/1980 | Adams | 138/99 X |
| 4,709,729 | A | 12/1987 | Harrison | 138/99 |
| 4,756,338 | A | 7/1988 | Guyatt et al. | 138/99 |

(Continued)

FOREIGN PATENT DOCUMENTS

GB 2210134 A 6/1989

OTHER PUBLICATIONS

Cynthia Greenwood; Composite Pipe Repair Method Shows Versatility, Long-Lasting; Feb. 2001, Pipeline & Gas Journal, p. 58.

(Continued)

*Primary Examiner*—Patrick Brinson
(74) *Attorney, Agent, or Firm*—Fish & Richardson P.C.

(57) ABSTRACT

A pipeline repair system includes a sleeve adapted to permanently enclose an outer surface of a longitudinal section of a pipeline having a defect. The sleeve includes two or more longitudinal segments of a cylinder joined at the longitudinal edges to form a sleeve with a first and second radial ends. The sleeve is sealed at the radial ends forming an enclosed annular space between the pipeline and the sleeve. An injection port assembly on the sleeve is adapted for temporary connection to an external source of pressurized material. The pressurized material may be a fluid, gas, or slurry. After filling the annulus with pressurized material, the port assembly is sealed. The permanent sleeve receives a majority of the tangential (hoop) stress load from the section of pipeline via the pressurized material in the annular space and may receive a portion of the longitudinal stress load from the section of pipeline.

In another embodiment, the injection and evacuation ports assemblies are omitted from the sleeve and a tap assembly is disposed on the sleeve. The tap assembly is adapted to receive a tapping tool for piercing the section of pipeline encased in the sleeve and allowing pressurized material from inside the pipeline to fill the annular space inside the sleeve.

The invention further encompasses a method of repairing a longitudinal section of a pipeline having a defect.

24 Claims, 7 Drawing Sheets

U.S. PATENT DOCUMENTS

| | | | |
|---|---|---|---|
| 5,079,824 A | 1/1992 | Lopez et al. | 138/98 X |
| 5,146,953 A | 9/1992 | Bell | 138/99 |
| 5,199,464 A | 4/1993 | Savard | 138/99 |
| 5,345,972 A | 9/1994 | Goglio et al. | 138/99 |
| 5,590,913 A | 1/1997 | Morris et al. | 285/18 |
| 5,722,463 A | 3/1998 | Smyth et al. | 138/170 |
| 5,853,030 A * | 12/1998 | Walding | 138/99 |
| 5,918,639 A | 7/1999 | Ottestad et al. | 138/99 |
| 5,950,683 A * | 9/1999 | Henderson et al. | 138/99 |
| 6,220,302 B1 | 4/2001 | Nolley | 138/99 |
| 6,305,719 B1 * | 10/2001 | Smith et al. | 285/15 |
| 6,612,341 B1 | 9/2003 | Vu | 138/99 |
| 6,884,373 B1 * | 4/2005 | Johnson et al. | 264/32 |
| 2004/0129373 A1 | 7/2004 | Nadarajah et al. | 156/94 |

OTHER PUBLICATIONS

David J. Boreman, Bradley O. Wimmer, Keith G. Leewis; Repair Technologies for Gas Transmission Pipelines; Mar. 2000; Pipeline & Gas Journal, pp. 46-51.

AEA Technology Consulting for the Health and Safety Executive; Temporary/permanent pipe repair—Guidelines; 2001/038 Offshore Technology Report, pp. 1-60.

Mo Mohitpour, Michael McManus, Bill Trefanenko; Pipeline rehab responding to regulatory pressures, technological advances; Jan. 20, 2003; Oil & Gas Journal, pp. 54-58.

International Search Report (6 pages) and Written Opinion of the International Searching Authority (6 pages) for PCT/US2005/034721, Mar. 17, 2006.

American Society of Mechanical Engineers. Gas Transmission and Distribution Piping Systems, ASME Code for Pressure Piping, B31. AMSE B31.8-1999 Edition. pp. 71-74.

* cited by examiner

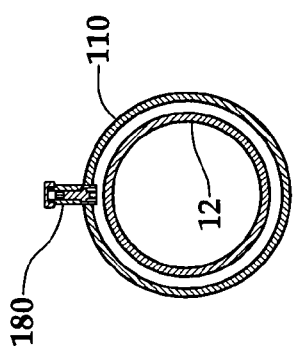
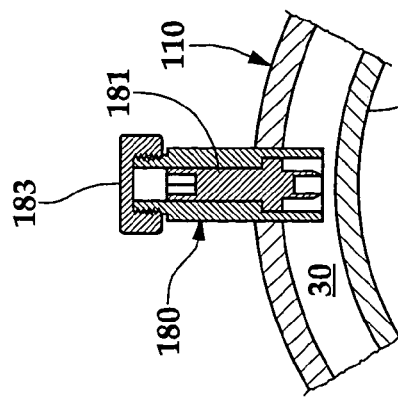
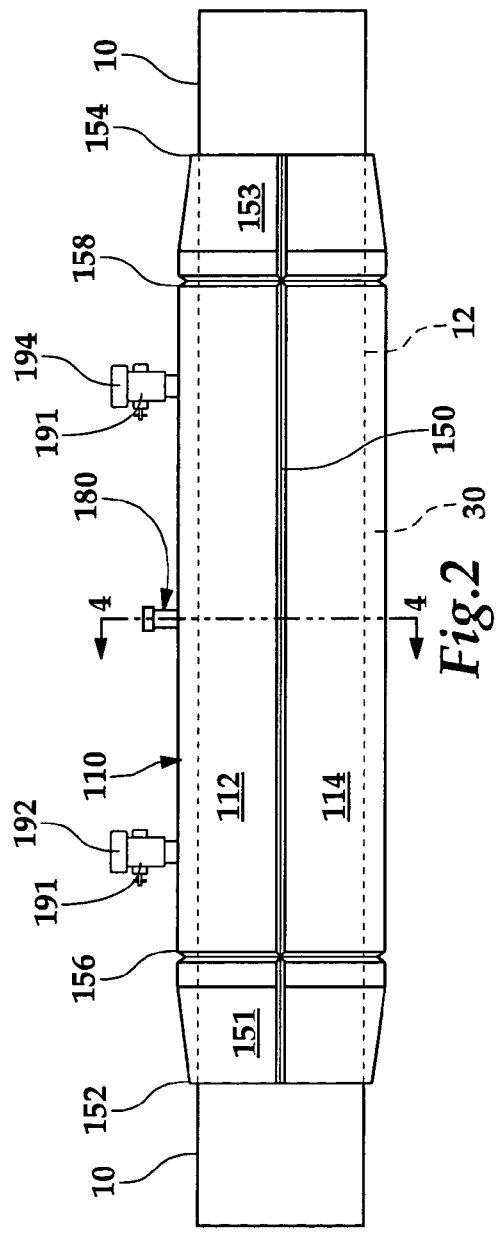
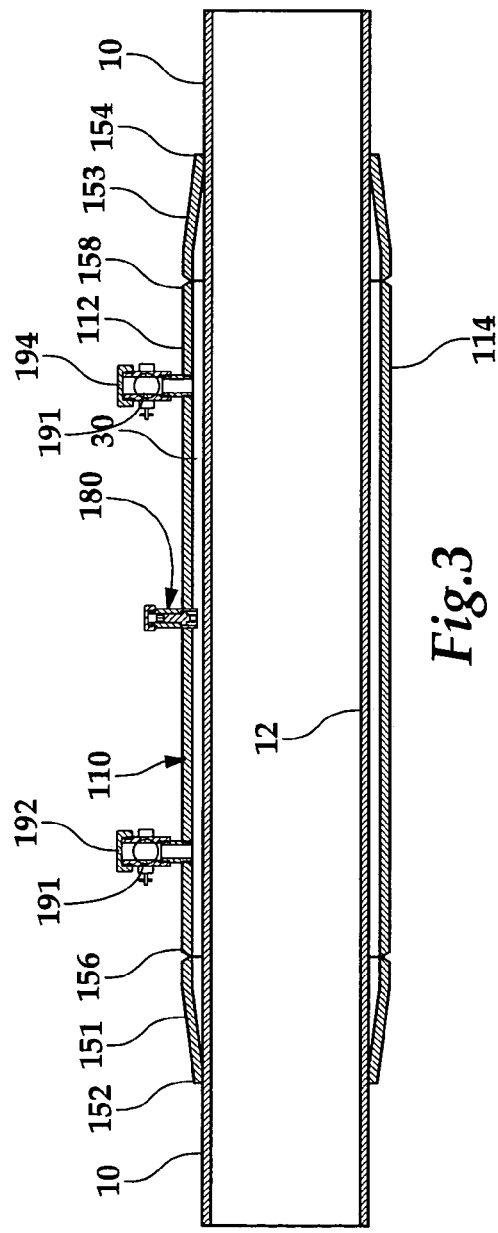

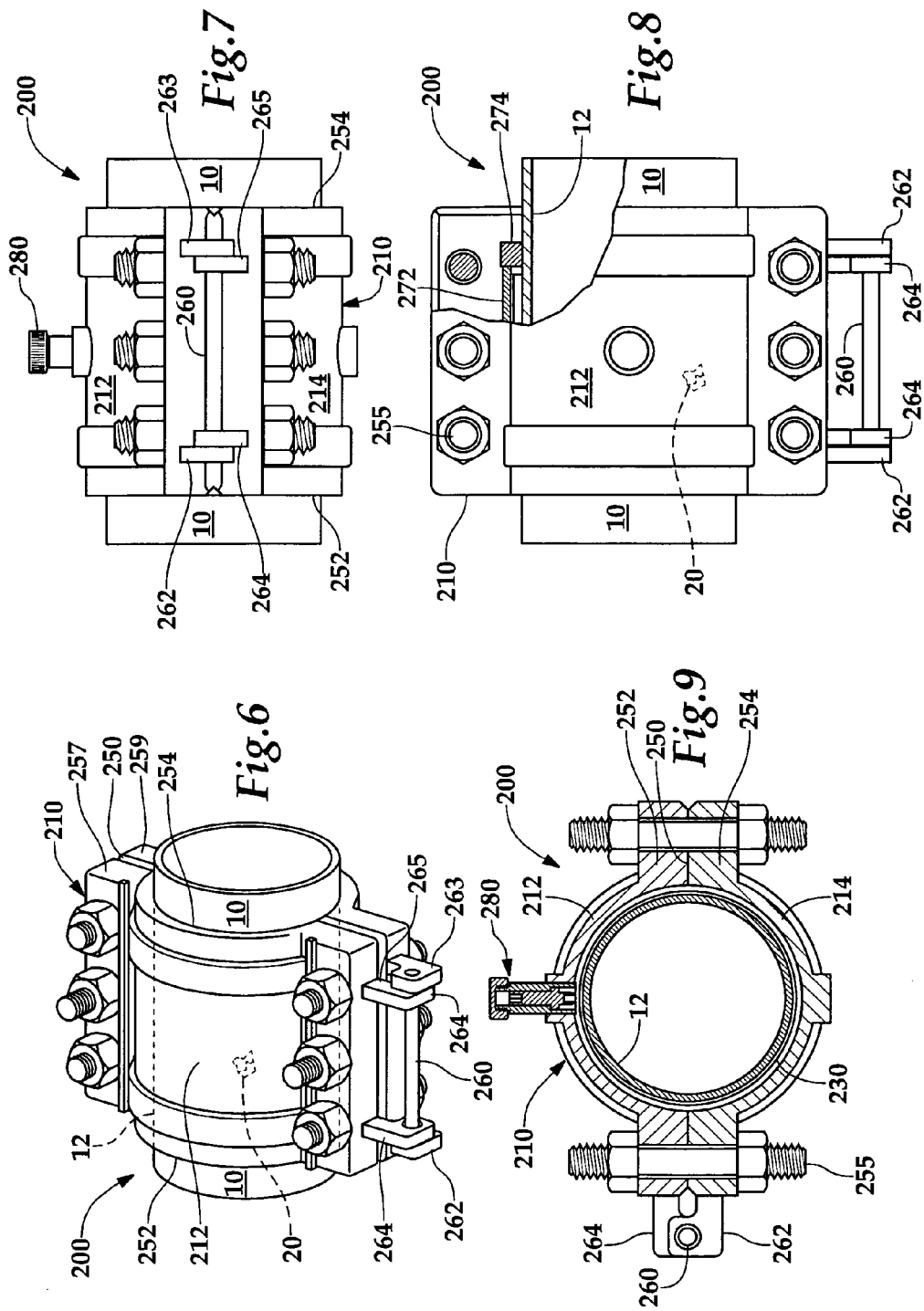

PIPELINE REPAIR SYSTEM AND METHOD OF INSTALLATION

TECHNICAL FIELD

The present invention relates to a permanent pipeline repair system and more particularly to an external sleeve that is permanently installed around an identified defect in the pipeline to be repaired.

BACKGROUND

It is well known in the pipeline industry that pipelines are subject to defects such as corrosion, mill defects, third party damage (e.g. dents, scratches, gouges), stress corrosion cracking and hydrogen induced cracking. Defects have the potential to cause catastrophic failure in pipelines that are in operation or under testing.

Various internal and external inspection methods for pipelines are well known in the art. When a defect has been identified, one of several prior art methods of repair may be selected based on the location of the pipeline, the type of defect and size of defect. David Boreman, Bradley Wimmer and Keith Leewis have published a paper on selection of repair methods titled "Repair Technologies for Gas Transmission Pipelines" in the *Pipeline & Gas Journal* in March 2000. The subject article is incorporated herein by reference. Additionally, a discussion of known prior art repair equipment and systems is compiled in a paper prepared by AEA Technology Consulting for the Health and Safety Executive Division for Offshore Technology Report 2001/038, the disclosure of which is incorporated by reference herein.

Stress Crack Corrosion ("SCC")

Particularly problematic and difficult to repair are defects in pipelines caused by stress crack corrosion ("SCC"). SCC is an area of corrosion (in this case on a pipe) that has developed cracks; the cracks increase in severity as the pipeline flexes due to operating pressure changes. The continuous flexing causes the metallic structure of the pipe to become brittle until there is a catastrophic fatigue failure. It is known within the industry that sleeves can be used for the repair of pipelines. However, there is a definite need for a practical, dependable, cost-effective, reliable, and repeatable product/method for the specific and permanent repair of pipelines having Stress Crack Corrosion (SCC). To date, the only proven and positive method to renew or rehabilitate pipes with SCC is to shut down the pipeline, depressurize the pipe, remove, vent or dump the product that the pipeline is carrying, cut out the section of pipe with SCC and replace that section of pipe with good or new pipe. It is then necessary to reinstate or commission the pipe to service using cumbersome and expensive pressure testing and commissioning procedures.

Prior Art

U.S. Pat. No. 5,722,463 discloses a pipe reinforcing sleeve that purports to be suitable for repairs of SCC defects in pipelines. The patent discloses heating the sleeve with a torch to thermally expand the sleeve. While heated and in an expanded state two halves of the sleeve are joined by welding. Upon subsequent cooling, the sleeve will be in tension and apply a compressive force to the pipeline. The system of the '463 patent requires a very tightly controlled installation method, including heating of the repair sleeve to a pre-determined temperature prior to installation, and maintaining this temperature during installation. Under field conditions this may present considerable practical difficulty. Under field conditions, such as fluctuating environmental temperatures, fluctuating pipeline flow rates, and because the pipeline is a large and efficient heat sink, repeatable repair results may be difficult to achieve.

U.S. Pat. No. 5,345,972 discloses a method of repairing a pipeline by applying a cylindrical sheath cladding (sleeve) consisting of two half shells welded together to create an inter-space, which is sealed by applying gaskets. Catalyzed resin is injected into the annular space. The sheath wall is placed under tension when the filling material is injected and the pipeline wall is put into compression. The gaskets sealing the ends of the pipe are removed after the epoxy has set. Due to shrinkage of the resin upon setting, the tension in the shell wall and the compression in the pipeline by the catalyzed resin is reduced or eliminated. After the gaskets sealing the ends of the pipe are removed, pressure is not maintained in the annulus between the sheath (sleeve). Because the annulus is not pressure sealed, the portion of the pipeline containing the defect can flex with changes in internal operating pressure. The method of repair taught in the '972 patent is not suitable for repair of SCC damage and there is no teaching of use for SCC repairs in the patent.

No single prior art pipeline system is versatile enough to repair all types of defects. A versatile system of pipeline repair is needed that includes the ability to permanently repair and rehabilitate in service pipelines, especially those with an SCC defect.

Distinguishing Features of the Present Invention

Some of the distinctive features of the pipeline repair system of the present invention are its cost effectiveness, reliable performance, straightforward installation procedure, and the fact that the end result is provable and scientifically documented as a solution to the problem. Particularly distinguishing the present invention from the prior art, the system can be used to universally repair all types of defects in a pipeline including repair of Stress Corrosion Cracks (SCC). As discussed in the "Repair Technologies for Gas Transmission Pipelines" article, most other repair methods including composite repair sleeves are restricted to repair of cracks of length less than 40% of the pipe wall thickness. The sleeve of the present invention becomes an integral permanent part of the pipeline and is capable of carrying a majority of the stress load of the pipeline.

SUMMARY

A pipeline repair system includes a sleeve adapted to permanently enclose an outer surface of a longitudinal section of a pipeline having a defect. The sleeve is capable of a maximum operating pressure equal to or greater than the maximum operating pressure of the pipeline. The sleeve includes two or more longitudinal segments of a cylinder joined at the longitudinal edges to form a sleeve with a first and second radial ends. The sleeve circumferentially surrounds the outer surface of the section of pipeline.

A first end seal is disposed between the sleeve and the section of the pipeline at the first radial end of the sleeve and a second end seal is disposed between the sleeve and the section of the pipeline at the second radial end of the sleeve. The seals form an enclosed annular space between the outer surface of the pipeline and the interior surface of the sleeve.

An injection port assembly on the sleeve is adapted for temporary connection to an external source of pressurized material. The pressurized material may be a fluid, gas, slurry or flowable catalyzed material. An evacuation port assembly is disposed on the sleeve for allowing the expulsion of gas, fluid or excess pressurized materials as the pressurized materials injected into the annulus.

The injection port assembly and the evacuation port assembly are sealed after the pressurized material is injected in the annulus. The permanent sleeve receives a majority of the tangential (hoop) stress load from the section of pipeline via the pressurized material in the annular space and may receive a portion of the longitudinal stress load from the pipeline.

In another embodiment, the injection and evacuation ports are omitted from the sleeve and a tap assembly is disposed on the sleeve. The tap assembly is adapted to receive a tapping tool for piercing the section of pipeline encased in the sleeve and allowing pressurized material from inside the pipeline to fill the annular space inside the sleeve. The sleeve receives a majority of tangential (hoop) stress load from the section of pipeline via the pressurized material in the annular space.

In a further embodiment, the injection and evacuation ports and the tap assembly are included on the sleeve. The sleeve receives a portion of the longitudinal stress load and a majority of the tangential (hoop) stress load from the section of pipeline with the defect via a solidified material that has been injected in a fluid state into the annular space and also the pressurized material from inside the pipeline that has been admitted to the annular space via piercing of the pipeline with the tapping tool.

The invention further encompasses a method of repairing a longitudinal section of a pipeline having a defect including the steps of: (a) positioning a first longitudinal segment of a cylinder having longitudinal edges and radially opposed ends and a second longitudinal segment of a cylinder having longitudinal edges and radially opposed ends around the section of pipeline to be repaired; (b) joining the segments at the longitudinal edges to form a sleeve that circumferentially surrounds the section of pipeline; (c) positioning a first end seal between the sleeve and the section of the pipeline at the first radial end of the sleeve and a second end seal between the sleeve and the section of the pipeline at the second radial end of the sleeve, thereby forming an enclosed annular space between the outer surface of the pipeline and the interior surface of the sleeve; (d) temporarily connecting an external source of pressurized material to an injection port assembly disposed on the sleeve; (e) temporarily opening an evacuation port assembly disposed on the sleeve; (f) substantially filling the annulus with pressurized material from the external source and pressurizing the annulus to a predetermined pressure; (g) sealing the injection and evacuation ports after the annular space is filled and pressurized; and (h) transferring a majority of the tangential (hoop) stress load from the section of pipeline being repaired to the sleeve via the pressurized material sealed in the annular space.

In other embodiments the injection and evacuation ports are omitted from the sleeve and a tap assembly is disposed on the sleeve. When using the pipe repairs system with this embodiment a tapping tool is connected to the tap assembly and the section of the pipeline enclosed in the sleeve is pierced with the tapping tool. Pressurized material flows from inside the pipeline to the annular space thereby equalizing the pressure in the annulus and in the inside of the pipeline. A portion of the longitudinal stress load and a majority of the tangential (hoop) stress load are transferred to the sleeve via the pressurized material in the annular space.

In yet another embodiment of the invention the injection and evacuation ports and the tap assembly are included on the sleeve. When using the pipe repair system of this embodiment a source of pressurized flowable material is attached to the injection port assembly and the evacuation port assembly is opened. Fluidized material, that will solidify in a predetermined time, fills the annulus. The injection and evacuation ports are sealed and the injected material is allowed to solidify. A tapping tool is connected to the tap assembly and the section of the pipeline enclosed in the sleeve is pierced with the tapping tool. Pressurized material flows from inside the pipeline to the annular space thereby equalizing the pressure in the annulus and in the inside of the pipeline. A portion of the longitudinal stress load and a majority of the tangential (hoop) stress load are transferred to the sleeve via the solidified injected material and the pressurized material in the annular space.

The details of one or more embodiments of the invention are set forth in the accompanying drawings and the description below. Other features, objects, and advantages of the invention will be apparent from the description and drawings, and from the claims.

DESCRIPTION OF DRAWINGS

The disclosed invention will be described with reference to the accompanying drawings, which show important sample embodiments of the invention and which are incorporated in the specification. A more complete understanding of the invention may be had by reference to the following detailed description when taken in conjunction with the accompanying drawings, wherein

FIG. 2 is a side view of the pipe repair system of FIG. 1;

FIG. 3 is a longitudinal cross section of the pipe repair system of FIG. 2;

FIG. 4 is a transverse cross section of the pipe repair system of FIG. 2;

FIG. 5 is an enlarged detail of the tapping assembly illustrated in FIG. 4;

FIG. 6 is a perspective view of a bolted embodiment of the pipe repair system of the present invention;

FIG. 7 is a side view of the pipe repair system of FIG. 6;

FIG. 8 is a top view of the pipe repair system of FIG. 7;

FIG. 9 is a transverse cross section of the pipe repair system of FIG. 7;

Like reference symbols in the various drawings indicate like elements.

DETAILED DESCRIPTION

Figure 1:
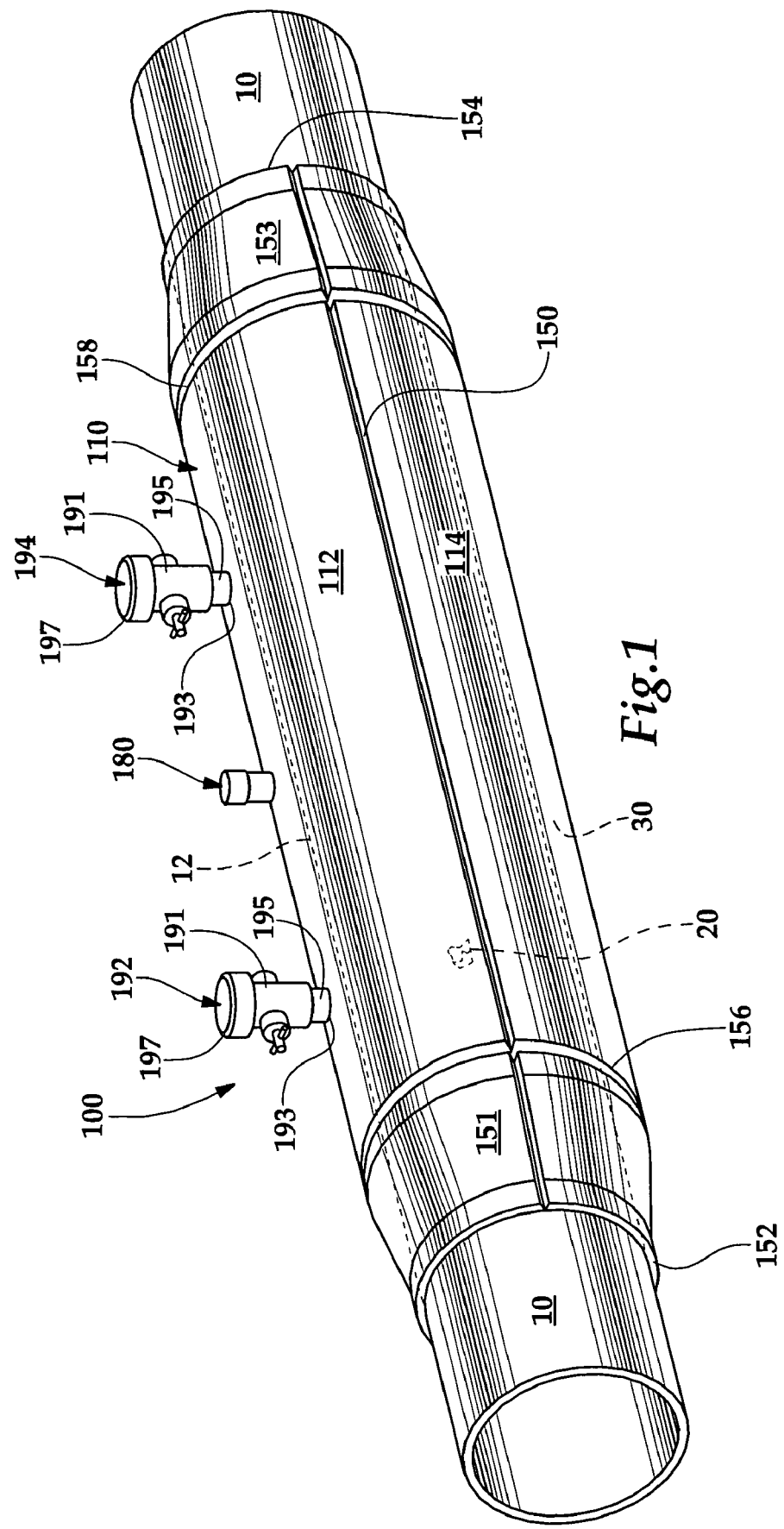
FIG. 1 is a perspective view of a welded embodiment of the repair system of the present invention.

Reference is now made to the Drawings wherein like reference characters denote like or similar parts throughout the Figures.

Referring now to FIGS. 1 through 5 wherein is illustrated a pipeline repair system 100 including a sleeve 110 made in two longitudinal segments of a cylinder ("halves") 112 and 114 that when mated together completely enclose a specific axial section 12 of pipeline 10 containing a defect 20 in need of repair. The two halves 112 and 114 are positioned on either side of the pipeline 10 and permanently joined together by making a high integrity liner weld axially on each longitudinal edge 150 at the point of mating of the two halves. It will be understood by those skilled in the art that more than two longitudinal segments may be used to form sleeve 110.

In the embodiment illustrated in FIGS. 1–5, the sleeve 110 is sealed to the pipeline 10 by welding each radially opposed end 156 and 158 to a seal formed from frustoconical seal pieces 151 and 153. The distal ends 152 and 154 of seal 151 and 153 are welded to the pipeline 10. The sleeve wall thickness and other parameters of the sleeve are predetermined to be leak proof at any operating or test pressure consistent with the maximum operating pressure and test pressure of the pipeline 10. The annulus 30 formed between the inside surface of the installed sleeve 110 and the outside surface of the section of pipe 12 that has been enclosed will be pressurized by one or more of several methods to be described hereinafter. The sleeve 110 is attached to the pipeline 10 and is an integral and permanent part of the pipeline 10. A majority of the tangential (hoop) stresses from the pipeline segment 12 is transferred to sleeve 110 via pressurized material in the annular 30. The hoop stress remaining in pipeline segment 12 in proximity to the defect 30 is below the stress required for the propagation of the fracture. A portion of the longitudinal stress is transferred to the sleeve 110 via the welded end seals.

In another embodiment as illustrated in FIGS. 6–9, the pipeline repair system 200 may include a bolt-on sleeve unit 210 made in two longitudinal segments of a cylinder ("halves") 212 and 214. When installed, the sleeve 210 forms an annular space 30 between the sleeve and the pipeline section 12 being repaired. The two halves 212 and 214 are bolted together at radially extending flanges 257 and 259 with fasteners 255. The fasteners are illustrated as studs threaded on both ends with mating nuts. It will be understood that other fasteners may be used in the system 200. A longitudinal seal 272 is disposed at the longitudinal edges 250 between the two halves. Sleeve 210 is sealed to the pipeline 10 by an elastomeric circumferential seal 274 located at radially opposing ends 252 and 254 of the sleeve 210 and at the interface point between the pipeline 10 and the sleeve 210. It will be understood that the present invention may include energized circumferential seals (not shown) that are compressed by end pack rings as are known in the art. An example of such energized end pack systems is illustrated in U.S. Pat. No. 1,051,086, the disclosure of which is incorporated by reference. It will be understood that the present invention may include a gripping mechanism (not shown) disposed at the opposed ends of the pipe repair sleeve 210 that will grip the pipeline 10 and prevent longitudinal movement of pipeline 10 within sleeve 210. Such gripping mechanism will facilitate the transfer of a portion of the longitudinal stress load from the pipeline to the sleeve 210. An example of such gripping systems is illustrated in U.S. Pat. No. 5,590,913 and in the BIMS TapTee manufactured by Big Inch Marine Systems, the disclosure of which is incorporated by reference.

It will be understood that more than two longitudinal segments may be used to form the sleeve. Upon completion of the installation procedure the sleeve 210 encloses an annulus 30 formed between the outside surface of the pipeline and the inside surface of the sleeve 210.

The sleeve 210 is predesigned to be leak proof at any operating or test pressure consistent with the maximum operating pressures and test pressures of the pipeline. The annulus 30 formed between the inside of the sleeve 210 and the outside of the section of pipeline 12 that has been enclosed will be pressurized by one or more of several methods hereinafter described. The sleeve 210 is attached to the pipeline 10 and is an integral and permanent part of the pipeline 10. A majority of the tangential (hoop) stress of the pipeline is transferred to sleeve 210 via the pressurized material in the annulus 30. The hoop stress remaining in pipeline segment 12 in proximity to the defect 30 is below the stress required for the propagation of the fracture.

As discussed previously, if a gripping mechanism is included in pipe repair system 200, a portion of the longitudinal stress will be transferred from the pipeline to sleeve 210.

To assist in installation of pipe repair system 200, a hinge is disposed on one side. The hinge is comprised of hinge members 262 and 263 disposed on sleeve segment 214 and hinge members 263 and 265 disposed on sleeve segment 212. Members 262 and 264 and members 263 and 265 are movably attached to pin 264.

This annular space 30 of pipe repair system 100 or 200 may be filled with a pressurized material, such that the material exerts pressure on the inside surfaces of the annular space. The material filling the annular space can be solid, liquid or gaseous or a combination thereof. A tap assembly 280 (more fully described hereinafter) may be provided to tap (or drill) a hole through the wall of the pipeline 10 being repaired, thereby pressurizing the annular space 30 to the same pressure as the internal pressure of pipeline 10. The tap tool can be of a design similar to the Dresser TAP-N-VALVE™ described in U.S. Pat. Nos. 3,142,205 and 3,302,493, incorporated herein by reference. A back seat can be provided to prevent external leakage after the tapping operation has been completed, while a threaded cap is welded to the body of the tap assembly 280.

The respective segments 112, 114 and 212 and 214 of the sleeve 110 and 210 may be symmetrical or asymmetrical; one or more of the sleeve segments 112 and 114 or 212 and 214 may incorporate at least one and perhaps more tap assemblies 180 for tapping the pipe section 12 within the annular space 30 or sleeve segments 112, 114, 212 and 214 may have one or more injection ports 192 with one or more evacuation ports 194 or alternatively the sleeve may have a single combination injection/evaluation port.

Figure 10A:
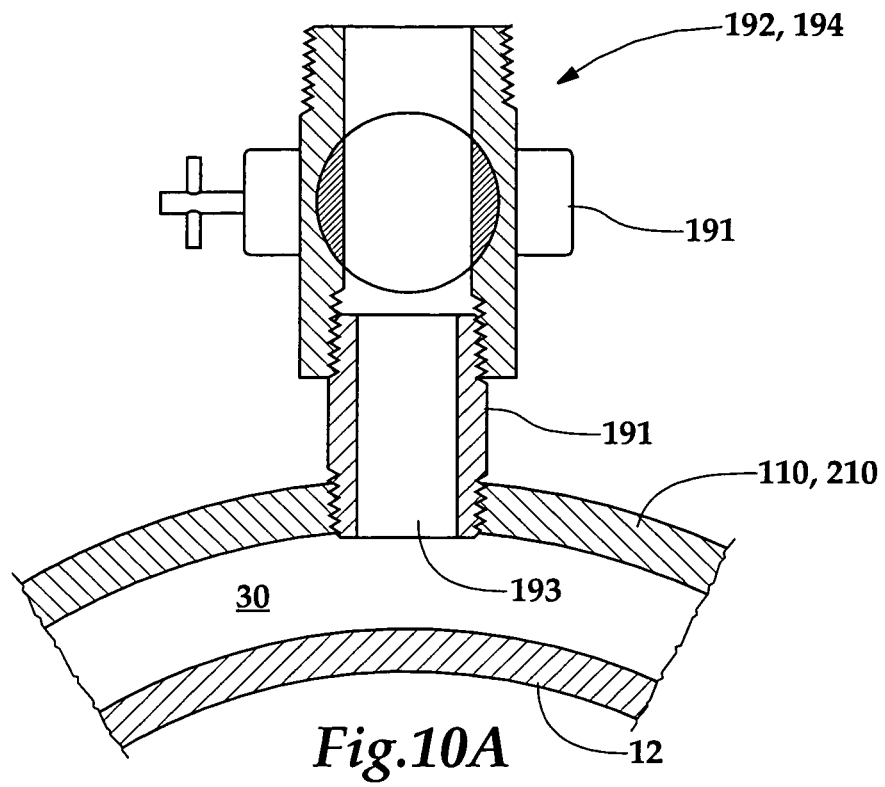
FIG. 10A is an enlarged cross-section of an injection/evacuation port assembly used on the pipe repair system of FIGS. 1 and 6.
Figure 10B:
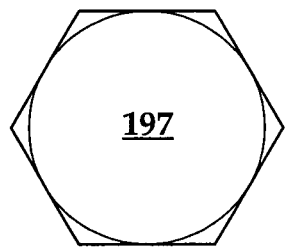
FIG. 10B is a top view of a plug for the injection/evacuation port assembly of FIG. 10A.
Figure 10C:
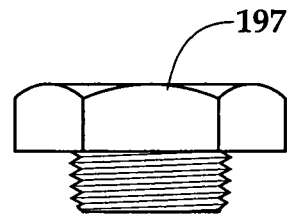
FIG. 10C is a side view of the plug of FIG. 10B.
Figure 10D:
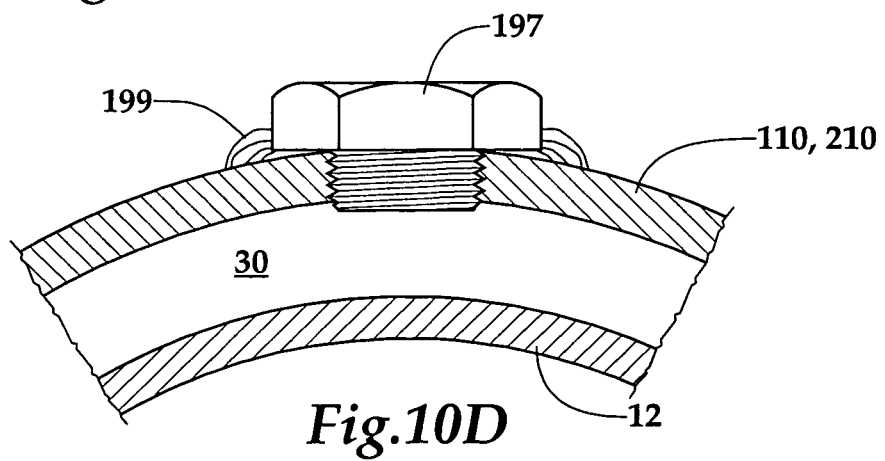
FIG. 10D is an enlarged cross-section of the opening for the injection/evacuation port assembly being sealed by the plug of FIG. 10B.

Referring now to FIG. 10A, therein is illustrated one embodiment of an injection port 192 and/or evacuation port 194. Closure members 191 are operable to allow gas, fluids, slurries and mixtures thereof to be injected through injection port assembly 192 into annulus 30 and entrained air and liquid and excess injected material to be expelled from evacuation port assembly 194. The closure member 191 may be a gate valve, ball valve, self-opening check valve or the closure means. The closure member 191 is attached to an opening 193 in sleeve 110 and 210 with a connector 195. A plug 197 may be installed in closure member 191 or directly in opening 193 and welded with weld material 199 to maintain a permanent gas tight seal. It will be understood that while the injection port assembly 192 and evacuation port assembly 194 are illustrated on sleeve 110, the port assemblies may be used on sleeve 210 or other sleeve configurations. It will be understood that any type of closure member now known or to be developed may be used for an injection port assembly and evacuation port assembly.

The repair system 100 and 200 may be used with a regular (or irregular) annular space 30. The pipe repair system 100, 200 may be installed on the pipeline 10 when the pipeline is in service carrying product at any pressure or flow rate up to the maximum allowed operating pressure of the pipeline 10.

Embodiments 100 and 200 allow for flexibility of repair of pipes manufactured from different material; for instance sleeve unit 210 is compatible with plastic, steel, concrete, cast-iron, fiberglass, ductile-iron or other types that do not allow for welding. This versatility addresses the need for applications in environments that may disallow or limit or preclude welding, for example, are but not limited to explosive, flammable or otherwise hazardous atmospheres. A congested heavily populated area where welding is not desired or could be considered unsafe. The bolt-on sleeve 210 also allows for installation where welding skills are not available or welding may not be practical, for example, a pipeline used for transporting gas or oil under sea commonly referred to as an offshore pipeline.

Theory of Thin Walled Cylinders

In order to explain the principle of operation of the repair system 100 and 200, it is useful to understand the theory of thin walled cylinder design. The web site http://www.me-ch.uwa.edu.au/DANotes/cylinders/thin/thin.html explains the theory behind the design equations for closed thin walled cylinders, which is widely used for pipe design. The stress in a pipeline has two components, the axial stress and tangential (or hoop) stress. For a pipe of inside diameter Di, outside diameter Do and thickness t, subject to internal and external pressures Pi and Po, it can be shown that the tangential stress Sigma_t is:

$$\text{Sigma\_}t = (Pi*Di - Po*Do)/2*t$$

The axial stress Sigma_a is:

$$\text{Sigma\_}a = (Pi*Di - Po*Do)/4*t$$

For a pipeline operating above ground, the value of Po is atmospheric pressure, and is normally neglected in the calculation of the axial and tangential stresses.

If a pipeline 10 with sleeve 110 or 210 and annular space 30 is filled with a fluid and the fluid is pressurized to the same value as the inside pressure on the pipeline 10, then the tangential stress would be reduced to zero, since Pi would equal Po. The value axial stress under the sleeve would be reduced by more than 50% since by virtue of welding the repair sleeve on to the outside of the pipeline, the area of material subject to axial loading is doubled.

If the pipeline 10 has a defect such as a corrosion pit or stress corrosion crack, there would be a stress concentration around the area of the defect 20, causing the stress in this area to be much higher than the theoretical values calculated by the thin walled cylinder theory. If the defect 20 is a stress corrosion crack, then pressure fluctuations in the pipeline could cause the cracks to propagate, leading to pipeline rupture. By virtue of installing the repair sleeves 110 or 210 and pressurizing the annular space 30, a majority of the stress hoop stress of segment 12 in the area of the defect 20 is transferred to sleeve 110 and 210. The residual stress proximal to the defect is reduced below the stress required for propagation of a fracture. This reduction in stress allows the pipeline 10 to be operated at its originally designed operating pressure.

Additionally, the pipe repair systems 100 and 200 prevent the pipeline 12 from flexing in the area of the defect 30. If the defect 30 is a SCC defect, eliminating flexure in the area of the defect reduces significantly the possibility for fatigue failure.

Figure 11A:
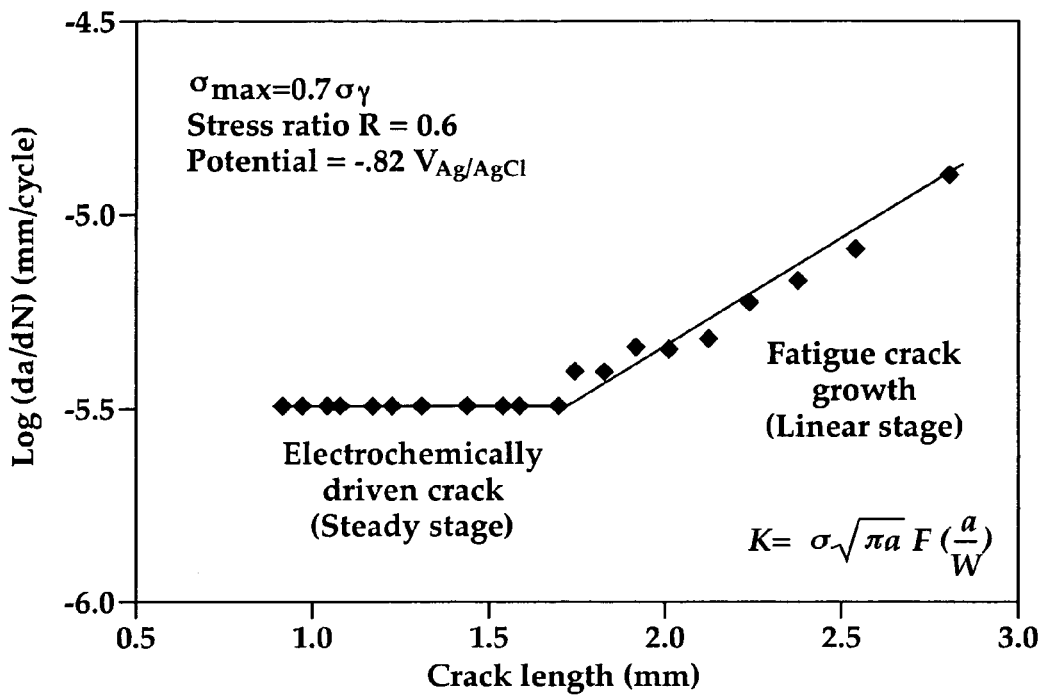
FIG. 11A is a graph illustrating the relationship between crack velocity and crack length.
Figure 11B:
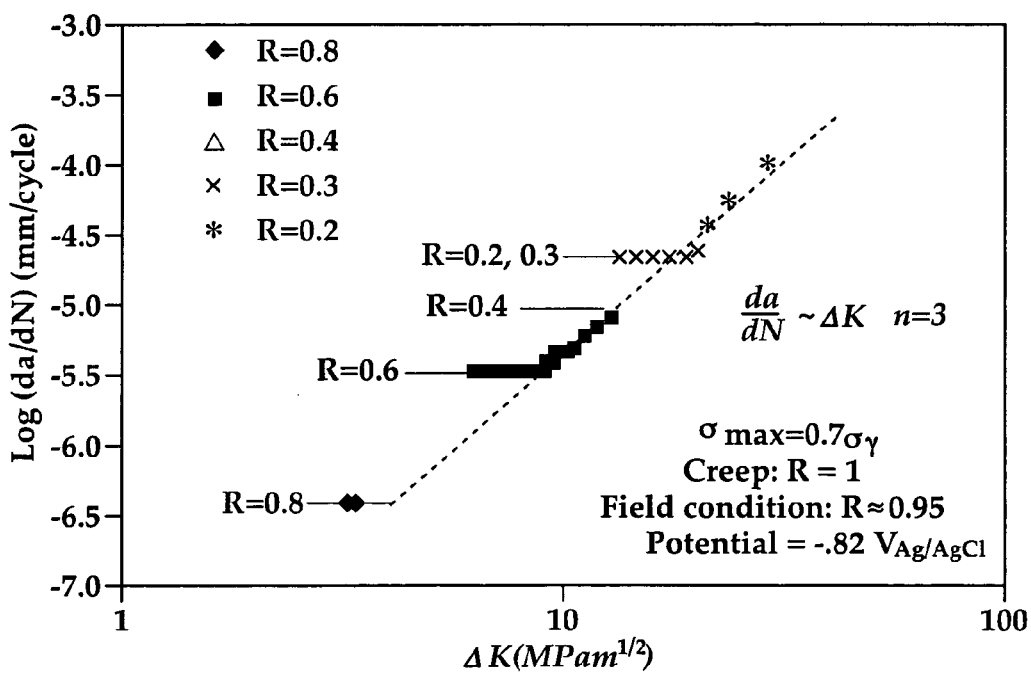
FIG. 11B is a graph illustrating the relationship between crack velocity and the amplitude of the stress intensity factor.
Figure 11C:
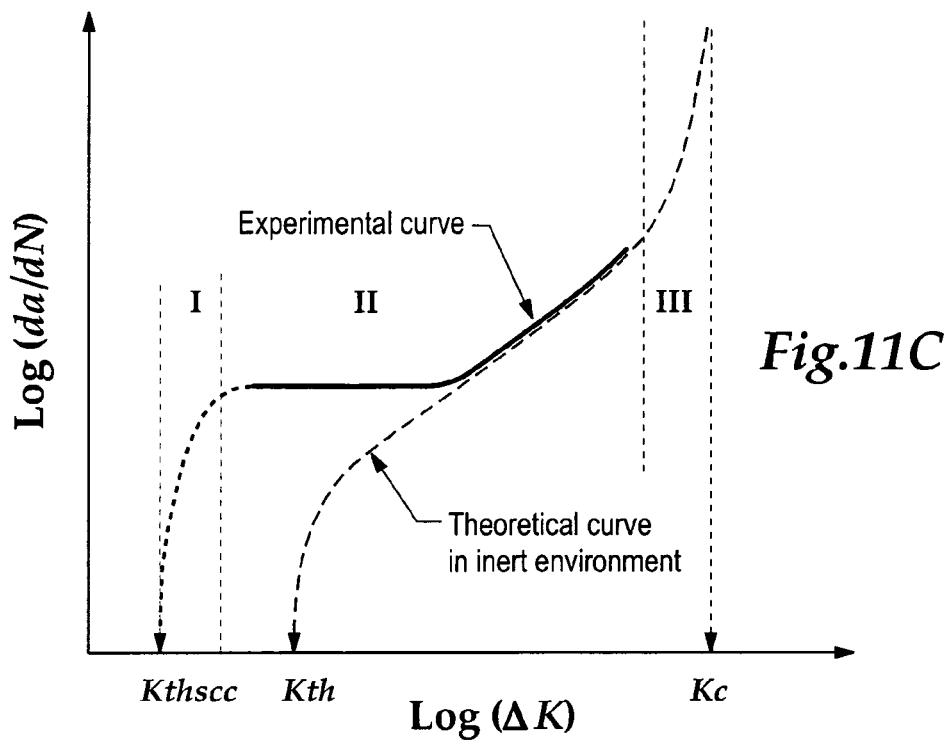
FIG. 11C is a graph illustrating the relationship between fatigue crack velocity and the amplitude of the stress intensity factor.

FIGS. 11A, 11B and 11C are graphs 7.3, 7.4 and 7.5 in a PhD dissertation *The Understanding and Modeling of Stress Corrosion Cracking in High Pressure Pipeline Steel* by Mr. Bing Zhang at the University of Illinois (2001), the disclosure of which is incorporated by reference. The following definitions apply to parameters illustrated in FIGS. 11A, 11B and 11C. K is the change in crack tip intensity factor between minimum stress and maximum stress during the cyclic fatigue test.

The formula for K is $$Kth = \sigma\sqrt{\pi \cdot a} \cdot F$$

Sigma:=stress
a=crack length
F is a geometric factor that depends on the ratio of the crack length and the width of the test specimen In a cyclic fatigue test Delta K is the difference between K at the high stress condition, and K at the low stress condition.

FIG. 11A illustrates the relationship between crack velocity and crack length. FIG. 11B illustrates the relationship between the crack velocity and the amplitude of the stress intensity factor. FIG. 11C illustrates the relationship between the fatigue crack velocity and the amplitude of the stress intensity factor. In FIG. 11C classical graph of log (da/dN) vs Log Delta_K demonstrates that the velocity of propagation of the SCC crack increases with K value. K value is proportional to stress for any given crack size. In a non SCC environment below a threshold Kth value, a SCC crack will not grow. However in a SCC environment, the crack will grow due to the electrochemical corrosion acting on the crack. By installing sleeve 110 or 210, the stress in the pipeline section 12 that is enclosed by the sleeve is reduced below the value of Kth. Additionally, the annular space 30 creates an inert environment preventing further electrochemical attack on the pipeline section defect 20.

Finite Element Analysis of Pipeline and Pipeline Repair Sleeve

Figure 12:
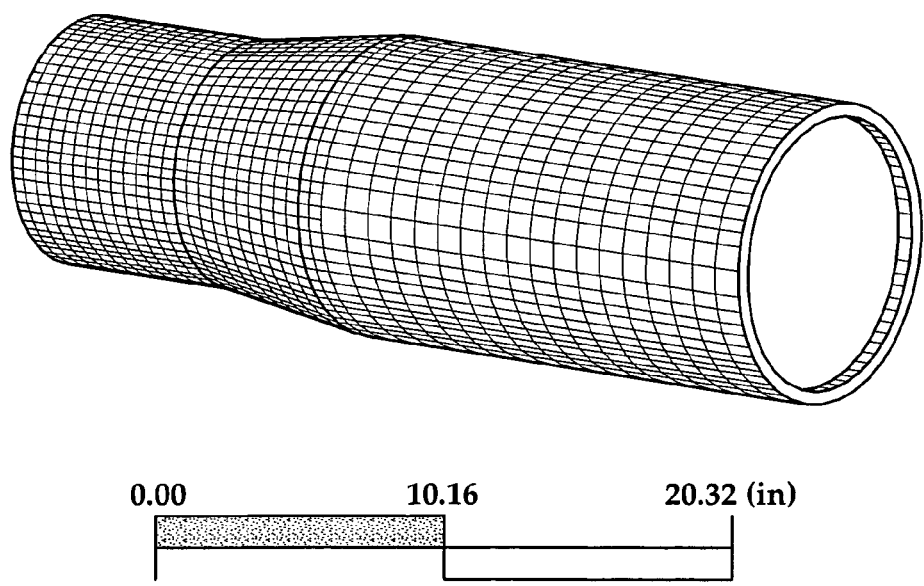
FIG. 12 is a perspective view of the mesh geometry used in a finite element analysis of the pipeline repair system of FIG. 1.

FIG. 12 illustrates a mesh geometry for a finite element analysis ("FEA") performed using ANSYS Software on sleeve 110. The hypothetical sleeve analyzed is a 10.75-inch diameter sleeve surrounding an 8.86-inch pipeline. The FEA analysis is performed on a sleeve and the pipeline both constructed of X42 grade pipe having the properties shown in Table I.

TABLE I

| X-42 Pipe Properties | |
|---|---|
| Modulus of Elasticity | $2.9 \times 10^7$ psi |
| Poisson's Ratio | 0.3 |

Figure 13A:
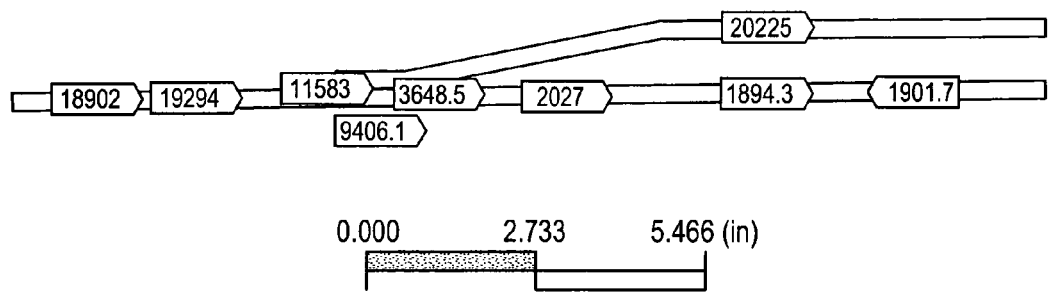
FIG. 13A is a graph illustrating a first case scenario of the maximum hoop stress present in a segment of the pipeline repair system of FIG. 1.

FIG. 13A illustrates the maximum hoop stress distribution in the sleeve 110 and the pipeline segment 12 of a first hypothetical loading case. The first load case is where the repair sleeve is installed on an above ground pipe, with the pipeline de-pressurized, then 1480 psi pressure is introduced into the pipe and into the annular space between the pipe and the sleeve. FIG. 13A illustrates that the hoop stress on the pipeline next to the sleeve is around 19,000 psi, where the hoop stress on the pipeline inside the sleeve away from the attachment location is around 1900 psi. This is around a ten-fold reduction in the hoop stress level. The calculations assume an axial restraining force of 86,471 lbf in the pipeline 10.

Figure 13B:
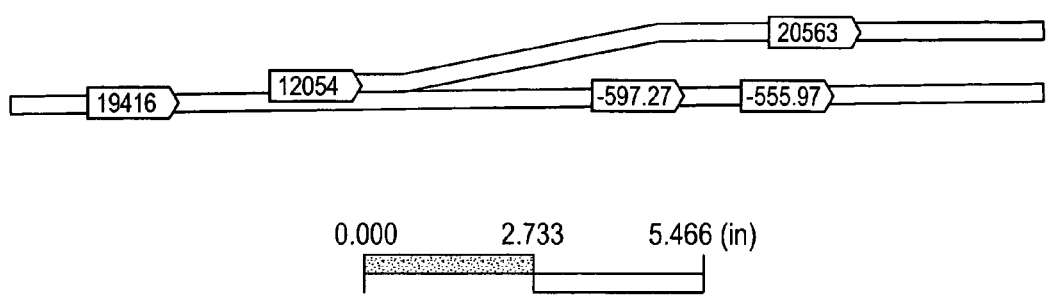
FIG. 13B is a graph illustrating a second case scenario of the maximum hoop stress present in a segment of the pipeline repair system of FIG. 1.

FIG. 13 B illustrates a maximum stress distribution in the sleeve 110 and pipeline segment 12 for a second hypothetical loading case. In the second case, the pipeline is a below ground pipe. There is no axial force on the pipeline since the pipe is restrained by soil friction, and an axial displacement constraint of zero is added to the FEA model in place of the axial force. Note that in this case the maximum hoop stress in the pipeline away from the sleeve is 19400 psi, and the stress in the pipeline inside the sleeve, at a location away from the attachment is 555 psi compressive.

The FEA demonstrates that there is a significant reduction in the stress level of the pipeline section 12 using the pipeline repair system of the present invention. The figures further illustrates that it is important to position the sleeve 110 on the pipeline 10 with the pipeline defect 30 as nearly as possible in the center of the sleeve as the stress in the pipeline segment 10 increases closer to the attachment point of the sleeve.

Method of Tapping to Equalize Pressure in Annulus

Once an area of damage 20 on pipeline 10 has been identified, qualified and quantified, a sleeve 110 or 210 is selected based on predetermined design factors and attached to the pipe enclosing the area of damage 20 inside and underneath the sleeve 110 or 210. Referring now to FIGS. 1 through 9, the sleeve 110 or 210 may include a method of hot tapping the pipeline 10 within the confines of the annulus 30. In one embodiment the tap assembly 180 or 280 is a device that has been machined out of solid bar stock or a forging that has been machined to accept a tapping tool 181 that when mechanically forced against the surface of the pipeline 10 will tap a hole into the pipeline 10 continuing into the pipeline until a force fit valve seat is provided. Tapping tools and their method of use are described in U.S. Pat. Nos. 5,142,205 and 3,302,493. When the tapping tool is retracted, the tool will travel back into the body of the machined bar stock or forged body until the opposite end of the tool that has a pre-machined valve seat comes into contact with a mating machined valve seat pre-machined into the bar stock or forging. The purpose of the tapping operation is to provide an opening in the pipeline 10 to allow pressure from the pipeline to pressurize the annulus 30 of the sleeve 110 and 210, thus eliminating any pressure differential between the inside of the pipeline 10 and the annulus 30. The result being that the pipeline 10 will no longer flex in the area of damage 20, as it will no longer be exposed to any differential forces resulting from internal pipeline pressure changes. Stopping the flexure of the pipeline 10 in the area of damage 20 is particularly important to stop the propagation of SCC cracks. The tapping assembly 180 may be pre-attached to the sleeve by welding. A plug 183 will be provided with the sleeve 110 or 210 to be welded over, on or into the tap assembly 180. A valve seat on the back of the tapping tool and on the inside of the tool housing body insures a bottle tight shut down during the plug welding operation closing the tap assembly. The tap assembly 180 should be oriented to be away from the immediate area of a SCC defect.

Method of Providing External Pressure to Annulus

In another embodiment of the invention, a sleeve 110 or 210 includes an injection port assembly 192 and an air, gas or liquid evacuation port assembly 194 manufactured and welded to the sleeve 110 or 210. These ports will also have access openings through the sleeve and will also be supplied with weld-on completion plugs 297 to be welded on, into or over the ports when the project is completed. The sleeve 110 or 210 is installed on the pipeline using the installation methods previously described. Upon completion of the sleeve installation process, a hydraulic injection system is attached to the injection port assembly 192 and flowable material is pumped into the sleeve unit. The flowable material may be, but is not limited to, a catalyzing resin like epoxy, cement grout, polyurethane, fiberglass or a non-catalyzing hydraulic like grease. When the annulus is full and the entrapped air, gas or liquid has been expelled, the evacuation port assembly is closed and the pressure is increased to a predetermined pressure that is less than or equal to the maximum operating pressure or maximum test pressure of the pipeline. In the case of a non-catalyzing hydraulic material, the pressure is held and permanently confined in the sleeve unit. With a catalyzing resin cement grout, or polyurethane, the material will become a solid. If the solidified injected material adheres to the exterior surface of the pipeline and the interior surface of the pipeline, a portion of the longitudinal stress of the pipeline 10 may be transferred to the sleeve 210 via the solidified injected material. Additionally, even if the solidified injected material does not adhere to the surfaces in the annulus 30, surface friction between the solidified material and the interior surface of the sleeve and exterior surface of the pipeline will transfer a portion of the longitudinal stress load to the pipeline. It will be understood that a combination of partial adhesion and surface friction will also be effective in transferring the longitudinal stress load. Whatever method is chosen as appropriate for a given application, the object will be to eliminate any opportunity for pipeline flexing in the area of SCC. As has been proven, when the SCC area cannot flex, then SCC failure cannot occur. In this application all mechanical forces that might cause flexing in the area of SCC will be transferred to the sleeve 110 or 210 thus eliminating the possibility of SCC flexural brittle failure.

Combination of Tapping and Injection

In another embodiment of the invention, the injection procedure is combined with the tapping procedure as previously described using one sleeve 110 or 210 filled with a flowable material capable of being solidified, including but not limited to catalyzed resin or grout. By using both methods in one application, pressure differential will be eliminated and stress transfer through the now solidified flowable material will be realized. It is desirable to install the flowable material and allow it to solidify prior to making the tap to equalize the external and internal pressure of the pipeline 10.

Advantages of Present Invention

The pipeline repair system of the present invention may be used to repair damage to a pipeline due to defects of all types including but not limited to corrosion, mill defects, third party damage, stress corrosion cracking and hydrogen induced cracking. The pipeline repair system may be used on pipelines operating at any or no pressure but is specifically designed for use on high pressure pipelines used to transport any gas, fluid, liquid, or slurry. This invention may be applied to pipelines that are buried under ground, suspended above ground, sub-aqueous, confined or exposed. This system may be used in connection with pipelines manufactured from but not limited to steel, cast-iron, plastic, concrete, or ductile-iron.

Several embodiments of the invention have been illustrated in the accompanying drawings and described in the Detailed Description. It will be understood that the invention is not limited to the embodiment disclosed, but is capable of numerous modifications without departing from the scope of the invention as claimed.

A number of embodiments of the invention have been described. Nevertheless, it will be understood that various modifications may be made without departing from the spirit and scope of the invention. Accordingly, other embodiments are within the scope of the following claims.

What is claimed is:

1. A pipeline repair system comprising:
   a sleeve adapted to permanently enclose an outer surface of a longitudinal section of a pipeline having a defect is said longitudinal section, said sleeve having:
      a first longitudinal segment of a cylinder having longitudinal edges and radially opposed ends,
      a second longitudinal segment of a cylinder having longitudinal edges and radially opposed ends,
   said segments being adapted to be joined at the longitudinal edges to form a sleeve with first and second radial ends and to circumferentially surround the outer surface of the section of said pipeline;
   a first end seal between the sleeve and the pipeline and at the first radial end of said sleeve and a second end seal between the sleeve and the pipeline at the second radial end of said sleeve, said seals adapted to form an enclosed annular space between the outer surface of said pipeline and an interior of the sleeve;
   a tap assembly disposed on the sleeve, said tap assembly having a first valve seat; and
   a tapping tool having a second valve seat, the tapping tool configured for piercing the section of pipeline encased in the sleeve and allowing pressurized material from inside the pipeline to fill the annular space, the tapping tool disposed within the tap assembly such that contact between the first valve seat and the second valve seat limits movement of the tapping tool away from the pipeline; and
   wherein, said sleeve is adapted to receive a majority of a tangential (hoop) stress load from said section of pipeline via the pressurized material in the annular space.

2. A pipeline repair system comprising:
   a sleeve adapted to permanently enclose an outer surface of a longitudinal section of a pipeline having a defect in said longitudinal section, said sleeve having:
      a first longitudinal segment of a cylinder having longitudinal edges and radially opposed ends,
      a second longitudinal segment of a cylinder having longitudinal edges and radially opposed ends,
   said segments being adapted to be joined at the longitudinal edges to form a sleeve with first and second radial ends and to circumferentially surround the outer surface of the section of pipeline;
   a first end seal between the sleeve and the pipeline at the first radial end of said sleeve and a second end seal between the sleeve and the pipeline at the second radial end of said sleeve, said seals adapted to form an enclosed annular space between the outer surface of said pipeline and an interior of the sleeve;
   an injection port assembly disposed on the sleeve, said injection port assembly having an access opening through the sleeve, said injection port assembly being adapted for temporary connection to an external source of flowable material that will solidify in a predetermined amount of time and a first closure member adapted to maintain said pressurized material in said annular space;
   an evacuation port assembly disposed on the sleeve, said evacuation port assembly having an access opening through the sleeve and a second closure member adapted to maintain said pressurized material in said annular space for installation in said injection port assembly;
   a tap assembly disposed on the sleeve, said tap assembly having a first valve seat; and
   a tapping tool having a second valve seat, the tapping tool configured for piercing the section of pipeline encased in the sleeve and allowing pressurized material from inside the pipeline to fill the annular space not filled by solidified flowable material, the tapping tool disposed within the tap assembly such that contact between the first valve seat and the second valve seat limits movement of the tapping tool away from the pipeline;
   wherein, said sleeve is adapted to receive a majority of a tangential (hoop) stress load from said section of pipeline via the epoxy material and pressurized material in the annular space.

3. A method of repairing a longitudinal section of a pipeline having a defect therein comprising the steps of:
   positioning around the section of pipeline a first longitudinal segment of a cylinder having longitudinal edges and radially opposed ends and a second longitudinal segment of a cylinder having longitudinal edges and radially opposed ends;
   joining the segments at the longitudinal edges to form a sleeve that circumferentially surrounds the section of pipeline and forms a first and second radial ends of said sleeve;
   positioning a first end seal between the sleeve of the pipeline at the first radial end of said sleeve and a second end seal between the sleeve of the pipeline at the second radial end of said sleeve, thereby forming an enclosed annular space between the outer surface of said pipeline and an interior surface of the sleeve;
   disposing a tapping tool in a tap assembly disposed on the sleeve;
   piercing the section of pipeline encased in the sleeve with the tapping tool;
   retracting the tapping tool within the tap assembly until a first valve seat of the tap assembly contacts a second valve seat of the tapping tool such that contact between the first valve seat and the second valve seat limits movement of the tapping tool away from the pipeline;
   allowing pressurized material from inside the pipeline to fill the annular space and equalizing the pressure in the annulus and inside the pipeline; and
   transferring a majority of a tangential (hoop) stress load from said section of pipeline to the permanent sleeve via the pressurized material contained in the annular space.

4. A method of repairing a longitudinal section of a pipeline having a defect therein comprising the steps of:
   positioning around the section of pipeline a first longitudinal segment of a cylinder having longitudinal edges and radially opposed ends and a second longitudinal segment of a cylinder having longitudinal edges and radially opposed ends;

joining the segments at the longitudinal edges to form a sleeve that circumferentially surrounds the section of pipeline and forms a first and second radial ends of said sleeve;

positioning a first end seal between the sleeve and the pipeline at the first radial end of said sleeve and a second end seal between the sleeve and the pipeline at the second radial end of said sleeve, thereby forming an enclosed annular space between the outer surface of said pipeline and the interior surface of the sleeve;

temporarily connecting an external source of flowable material that will solidify in a predetermined amount of time to an injection port assembly disposed on the sleeve;

temporarily opening an evacuation port assembly disposed on the sleeve;

substantially filling the annulus with flowable material from the external source and pressurizing the annulus to a predetermined pressure;

sealing the injection and evacuation ports assemblies and allowing the flowable material to solidify after the annular space is filled and pressurized;

disposing a tapping tool in a tap assembly disposed on the sleeve;

piercing the section of pipeline encased in the sleeve with the tapping tool;

retracting the tapping tool within the tap assembly until a first valve seat of the tap assembly contacts a second valve seat of the tapping tool such that contact between the first valve seat and the second valve seat limits movement of the tapping tool away from the pipeline;

allowing pressurized material from inside the pipeline to fill the annular space not filled by the solidified flowable material and equalizing the pressure in the annulus and inside the pipeline; and transferring a majority of a tangential (hoop) stress load from said section of pipeline to the permanent sleeve via the solidified flowable material and pressurized material contained in the annular space.

5. The pipeline repair system of claim 1 further including at least one additional longitudinal segment of a cylinder adapted to be joined to the other longitudinal segments to form the sleeve.

6. The pipeline repair system of claim 2 further including at least one additional longitudinal segment of a cylinder adapted to be joined to the other longitudinal segments to form the sleeve.

7. The method of repair of claim 3 further including positioning and joining at least one additional longitudinal segment of a cylinder to form the sleeve.

8. The method of repair of claim 4 further including positioning and joining at least one additional longitudinal segment of a cylinder to form the sleeve.

9. The pipeline repair system of claim 1 wherein the longitudinal edges of the longitudinal segments have been prepared for joining by welding.

10. The pipeline repair system of claim 2 wherein the longitudinal edges of the longitudinal segments have been prepared for joining by welding.

11. The pipeline repair system of claim 1 further include:
a radially extending flange disposed at each longitudinal edge of the longitudinal segments; and
at least one fastener for securing the flanges together.

12. The pipeline repair system of claim 2 further include:
a radially extending flange disposed at each longitudinal edge of the longitudinal segments; and
at least one fastener for securing the flanges together.

13. The method of repair of claim 3 wherein the step of joining the longitudinal edges to form a sleeve comprises welding.

14. The method of repair of claim 4 wherein the step of joining the longitudinal edges to form a sleeve comprises welding.

15. A pipeline repair system comprising:
a sleeve adapted to permanently enclose an outer surface of a longitudinal section of a pipeline having a defect is said longitudinal section, said sleeve having:
a first longitudinal segment of a cylinder having longitudinal edges and radially opposed ends,
a second longitudinal segment of a cylinder having longitudinal edges and radially opposed ends,
said segments being adapted to be joined at the longitudinal edges to form a sleeve with first and second radial ends and to circumferentially surround the outer surface of the section of said pipeline;
a first end seal between the sleeve and the pipeline and at the first radial end of said sleeve and a second end seal between the sleeve and the pipeline at the second radial end of said sleeve, said seals adapted to form an enclosed annular space between the outer surface of said pipeline and an interior of the sleeve;
a tap assembly disposed on the sleeve, said tap assembly adapted to receive a tapping tool for piercing the section of pipeline encased in the sleeve and allowing pressurized material from inside the pipeline to fill the annular space; and
wherein said sleeve is adapted to receive a majority of a tangential (hoop) stress load from said section of pipeline via the pressurized material in the annular space and
wherein the end seal comprises a frustoconical tube wherein the base is welded to the radial end of said sleeve and the top is welded to the pipeline.

16. A pipeline repair system comprising:
a sleeve adapted to permanently enclose an outer surface of a longitudinal section of a pipeline having a defect in said longitudinal section, said sleeve having:
a first longitudinal segment of a cylinder having longitudinal edges and radially opposed ends,
a second longitudinal segment of a cylinder having longitudinal edges and radially opposed ends,
said segments being adapted to be joined at the longitudinal edges to form a sleeve with first and second radial ends and to circumferentially surround the outer surface of the section of pipeline;
a first end seal between the sleeve and the pipeline at the first radial end of said sleeve and a second end seal between the sleeve and the pipeline at the second radial end of said sleeve, said seals adapted to form an enclosed annular space between the outer surface of said pipeline and an interior of the sleeve;
an injection port assembly disposed on the sleeve, said injection port assembly having an access opening through the sleeve, said injection port assembly being adapted for temporary connection to an external source of flowable material that will solidify in a predetermined amount of time and a first closure member adapted to maintain said pressurized material in said annular space;

an evacuation port assembly disposed on the sleeve, said evacuation port assembly having an access opening through the sleeve and a second closure member adapted to maintain said pressurized material in said annular space for installation in said injection port assembly;

a tap assembly disposed on the sleeve, said tap assembly adapted to receive a tapping tool for piercing the section of pipeline encased in the sleeve and allowing pressurized material from inside the pipeline to fill the annular space not filled by solidified flowable material; and wherein, said sleeve is adapted to receive a majority of a tangential (hoop) stress load from said section of pipeline via the epoxy material and pressurized material in the annular space and wherein the end seal comprises a frustoconical tube wherein the base is welded to the radial end of said sleeve and the top is welded to the pipeline.

17. A method of repairing a longitudinal section of a pipeline having a defect therein comprising the steps of:

positioning around the section of pipeline a first longitudinal segment of a cylinder having longitudinal edges and radially opposed ends and a second longitudinal segment of a cylinder having longitudinal edges and radially opposed ends;

joining the segments at the longitudinal edges to form a sleeve that circumferentially surrounds the section of pipeline and forms a first and second radial ends of said sleeve;

positioning a first end seal between the sleeve of the pipeline at the first radial end of said sleeve and a second end seal between the sleeve of the pipeline at the second radial end of said sleeve, thereby forming an enclosed annular space between the outer surface of said pipeline and an interior surface of the sleeve;

temporarily connecting a tapping tool to a tap assembly disposed on the sleeve;

piercing the section of pipeline encased in the sleeve with the tapping tool and allowing pressurized material from inside the pipeline to fill the annular space and equalizing the pressure in the annulus and inside the pipeline;

sealing the injection and evacuation ports assemblies after the annular space is filled and the pressure is equalized; and transferring a majority of a tangential (hoop) stress load from said section of pipeline to the permanent sleeve via the pressurized material contained in the annular space;

wherein the step of positioning an end seal comprises welding a base of a frustoconical tube to the radial end of said sleeve and welding the top to the frustoconical tube to the pipeline.

18. A method of repairing a longitudinal section of a pipeline having a defect therein comprising the steps of:

positioning around the section of pipeline a first longitudinal segment of a cylinder having longitudinal edges and radially opposed ends and a second longitudinal segment of a cylinder having longitudinal edges and radially opposed ends;

joining the segments at the longitudinal edges to form a sleeve that circumferentially surrounds the section of pipeline and forms a first and second radial ends of said sleeve;

positioning a first end seal between the sleeve and the pipeline at the first radial end of said sleeve and a second end seal between the sleeve and the pipeline at the second radial end of said sleeve, thereby forming an enclosed annular space between the outer surface of said pipeline and the interior surface of the sleeve;

temporarily connecting an external source of flowable material that will solidify in a predetermined amount of time to an injection port assembly disposed on the sleeve;

temporarily opening an evacuation port assembly disposed on the sleeve;

substantially filling the annulus with flowable material from the external source and pressurizing the annulus to a predetermined pressure;

sealing the injection and evacuation ports assemblies and allowing the flowable material to solidify after the annular space is filled and pressurized;

temporarily connecting a tapping tool to a tap assembly disposed on the sleeve;

piercing the section of pipeline encased in the sleeve with the tapping tool and allowing pressurized material from inside the pipeline to fill the annular space not filled by the solidified flowable material and equalizing the pressure in the annulus and inside the pipeline; and transferring a majority of a tangential (hoop) stress load from said section of pipeline to the permanent sleeve via the solidified flowable material and pressurized material contained in the annular space wherein the step of positioning an end seal comprises a welding a base of a frustoconical tube to the radial end of said sleeve and welding the top to the frustoconical tube to the pipeline.

19. The method of repair of claim 4 wherein the step of substantially filling the annulus with a flowable material includes filling the annulus with a material selected from a group consisting of a catalyzing resin, cement grout, polyurethane and fiberglass.

20. The pipeline repair system of claim 2 wherein the flowable material is selected from a group consisting of a catalyzing resin, cement grout, polyurethane and fiberglass.

21. The method of repair of claim 4 further including transferring a portion of longitudinal stress load from said section of pipeline to the permanent sleeve via surface friction between the solidified flowable material and the interior surface of the sleeve.

22. The method of repair of claim 4 further including transferring a portion of longitudinal stress load from said section of pipeline to the permanent sleeve via surface friction between the solidified flowable material and the exterior surface of the pipeline.

23. The method of repair of claim 4 further including transferring a portion of longitudinal stress load from said section of pipeline to the permanent sleeve via adhesion between the solidified flowable material and the interior surface of the sleeve.

24. The method of repair of claim 4 further including transferring a portion of longitudinal stress load from said section of pipeline to the permanent sleeve via adhesion between the solidified flowable material and the exterior surface of the sleeve.

* * * * *

UNITED STATES PATENT AND TRADEMARK OFFICE
CERTIFICATE OF CORRECTION

PATENT NO. : 7,165,579 B2  Page 1 of 1
APPLICATION NO. : 10/952657
DATED : January 23, 2007
INVENTOR(S) : Robin Neil Borland et al.

It is certified that error appears in the above-identified patent and that said Letters Patent is hereby corrected as shown below:

In column 11, claim 1, line 23, delete "is" and insert -- in --, therefor.

In column 11, claim 1, line 48, after "pipeline;" delete "and".

In column 14, claim 15, line 14, delete "is" and insert -- in --, therefor.

In column 14, claim 15, line 22 (approx.), after "pipeline" delete ":" and insert -- ; --, therefor.

In column 16, claim 18, line 31, after "comprises" delete "a".

Signed and Sealed this

Sixteenth Day of March, 2010

David J. Kappos
*Director of the United States Patent and Trademark Office*